(12) United States Patent
Wallon (10) Patent No.: US 12,520,766 B2
(45) Date of Patent: Jan. 13, 2026

(54) ELECTRIC MOWER

(71) Applicant: KUBOTA CORPORATION, Osaka (JP)

(72) Inventor: Daniel Wallon, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 389 days.

(21) Appl. No.: 18/213,299

(22) Filed: Jun. 23, 2023

(65) Prior Publication Data

US 2024/0423131 A1 Dec. 26, 2024

(51) Int. Cl.
*A01D 69/02* (2006.01)
*A01D 34/00* (2006.01)
*A01D 67/00* (2006.01)
*A01D 101/00* (2006.01)

(52) U.S. Cl.
CPC ............ *A01D 69/02* (2013.01); *A01D 34/006* (2013.01); *A01D 67/005* (2013.01); *A01D 2101/00* (2013.01)

(58) Field of Classification Search
CPC ...... A01D 34/006; A01D 34/64; A01D 34/75; A01D 67/005; A01D 69/02; B60L 50/66; B60L 53/62; B60L 58/13
See application file for complete search history.

(56) References Cited

U.S. PATENT DOCUMENTS

| | | | |
|---|---|---|---|
| 6,571,542 B1 * | 6/2003 | Fillman | B60L 50/66 56/10.2 A |
| 2016/0057924 A1 * | 3/2016 | Asahara | A01D 34/64 180/312 |
| 2022/0304226 A1 * | 9/2022 | Yang | A01D 34/78 |
| 2022/0408638 A1 | 12/2022 | Ito et al. | |
| 2023/0105559 A1 * | 4/2023 | Wang | B60L 53/62 180/68.5 |
| 2024/0157847 A1 * | 5/2024 | Holeton | B60L 58/13 |

\* cited by examiner

*Primary Examiner* — Joseph M Rocca
*Assistant Examiner* — Robert E Pezzuto
(74) *Attorney, Agent, or Firm* — GREENBLUM & BERNSTEIN, P.L.C.

(57) ABSTRACT

An electric mower includes: a wheel; a body frame including a right frame section and a left frame section and supported by the wheel on ground; a battery between the right frame section and the left frame section in a plan view; and a plate unit supported by the body frame and supporting the battery from below, the plate unit including: at least one first plate supported by the right frame section and the left frame section; a second plate forward of the at least one first plate; a third plate backward of the at least one first plate; and a fourth plate supported by the at least one first plate and supporting the second plate and the third plate.

13 Claims, 6 Drawing Sheets

ELECTRIC MOWER

FIELD OF THE INVENTION

The present invention relates to an electric mower including a mower unit drivable by a motor.

BACKGROUND OF THE INVENTION

An electric mower includes wheels and a mower unit. The wheels are drivable on electric power from a battery for the electric mower to travel. The mower unit is also drivable on electric power from the battery to cut grass. As disclosed in US2022408638A1, an electric mower includes a battery at a back portion of its body.

There has been a demand for a battery with a large capacity for improvement of the efficiency in the mowing operation. This has in turn led to a need to place a large-sized battery on the body efficiently and mount the battery on the body accurately, that is, a need to efficiently and accurately mount components such as a battery on the body.

The present invention has an object of providing an electric mower including components mounted on its body efficiently and accurately.

SUMMARY OF THE INVENTION

To attain the above object, an electric mower as an embodiment of the present invention includes: a wheel; a body frame including a right frame section and a left frame section and supported by the wheel on ground; a battery between the right frame section and the left frame section in a plan view; and a plate unit supported by the body frame and supporting the battery from below, the plate unit including: at least one first plate supported by the right frame section and the left frame section; a second plate forward of the at least one first plate; a third plate backward of the at least one first plate; and a fourth plate supported by the at least one first plate and supporting the second plate and the third plate.

With the above configuration, the battery is supported at two or more positions apart from one another by the second plate and the third plate, which are forward and backward of the first plate, respectively. The battery is thereby supported by the body frame stably and accurately. Further, the plate unit is supported by the body frame at the first plate, which supports the second plate and the third plate. The plate unit is thereby firmly supported by the body frame with a minimal configuration and easily attachable to and detachable from the body frame with a simple configuration.

The electric mower may be configured such that the fourth plate extends in a front-back direction of the electric mower from the second plate to the third plate.

The electric mower may be configured such that the body frame includes a back end section connected with a back end portion of the right frame section and a back end portion of the left frame section, and the third plate is apart from the right frame section, the left frame section, and the back end section.

The electric mower may be configured such that the second plate includes, at each of opposite lateral end portions thereof, a first support protruding backward to support the battery, and the third plate includes, at each of opposite lateral end portions thereof, a second support protruding forward to support the battery.

The electric mower may be configured such that the plate unit further includes a bracket holding the battery laterally.

The electric mower may be configured such that the plate unit is attachable to and detachable from the right frame section and the left frame section.

The electric mower may be configured such that the at least one first plate, the second plate, the third plate, and the fourth plate are integral with one another.

The electric mower may be configured such that the at least one first plate includes a plurality of first plates.

The electric mower may further include: a rollover protection structure fixed to the body frame at a position, wherein the at least one first plate includes two first plates forward and backward of the position, respectively.

The electric mower may be configured such that the rollover protection structure includes: a right vertical section fixed to the right frame section; a left vertical section fixed to the left frame section; and a cross member coupling a lower portion of the right vertical section to a lower portion of the left vertical section.

The electric mower may be configured such that the battery is fixed to the at least one first plate with an elastic member in-between and to the second plate, the third plate, and the fourth plate with no elastic member in-between.

The electric mower may be configured such that a driver's seat, wherein the battery is in a space extending from respective back end portions of the right frame section and the left frame section to below the driver's seat.

The electric mower may further include: a mower unit disposed below the battery and capable of being lifted and lowered.

The electric mower may be configured such that the battery is disposed toward a first side in a left-right direction of the electric mower, the electric mower further includes a holder device disposed between the battery and the body frame on a second side in the left-right direction and configured to temporarily hold the mower unit at a lifted position.

BRIEF DESCRIPTION OF THE DRAWINGS

The present disclosure is further described in the detail description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE INVENTION

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

Overall Configuration of Electric Mower

Figure 1:
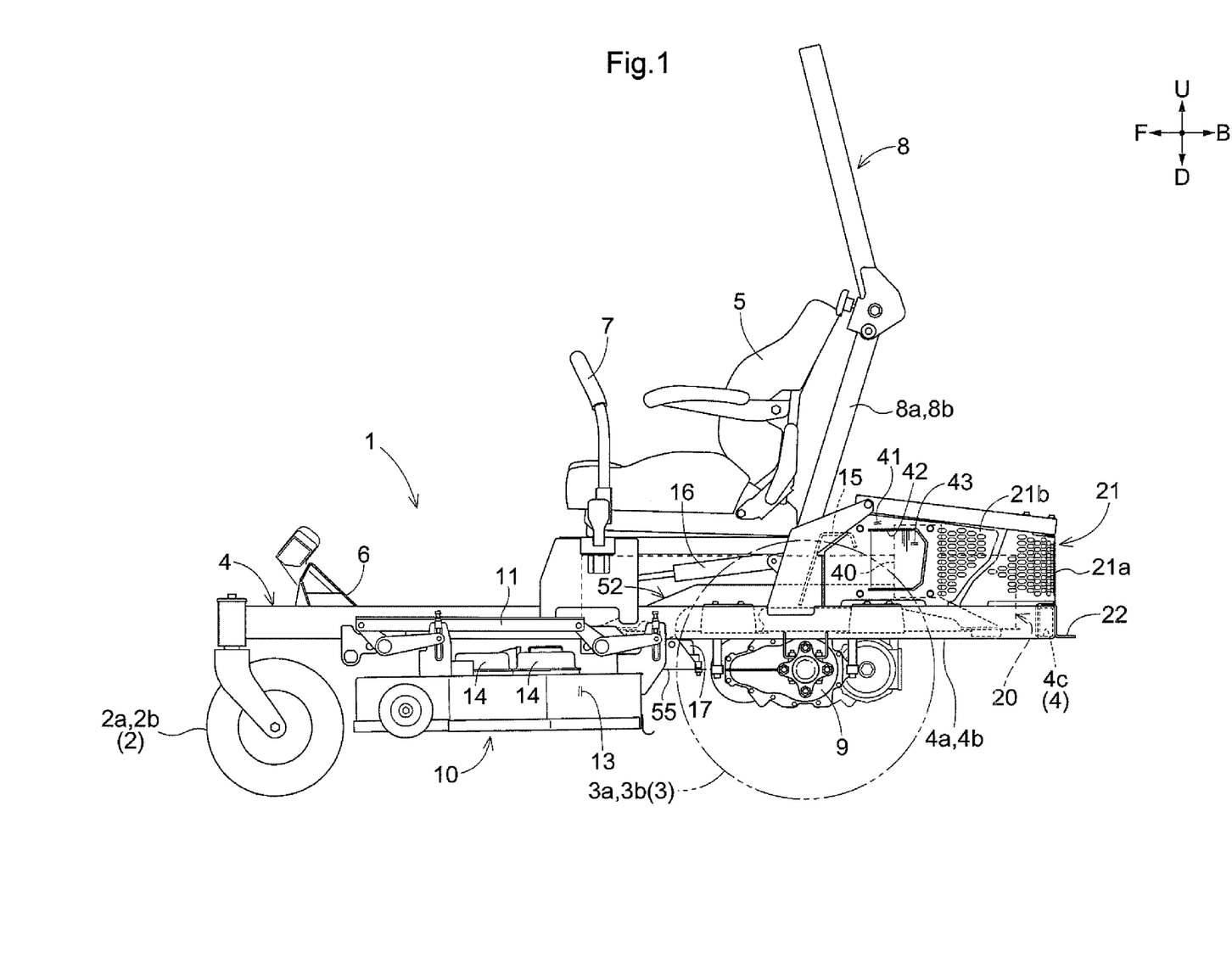
FIG. 1 is a side view of an electric mower.
Figure 2:
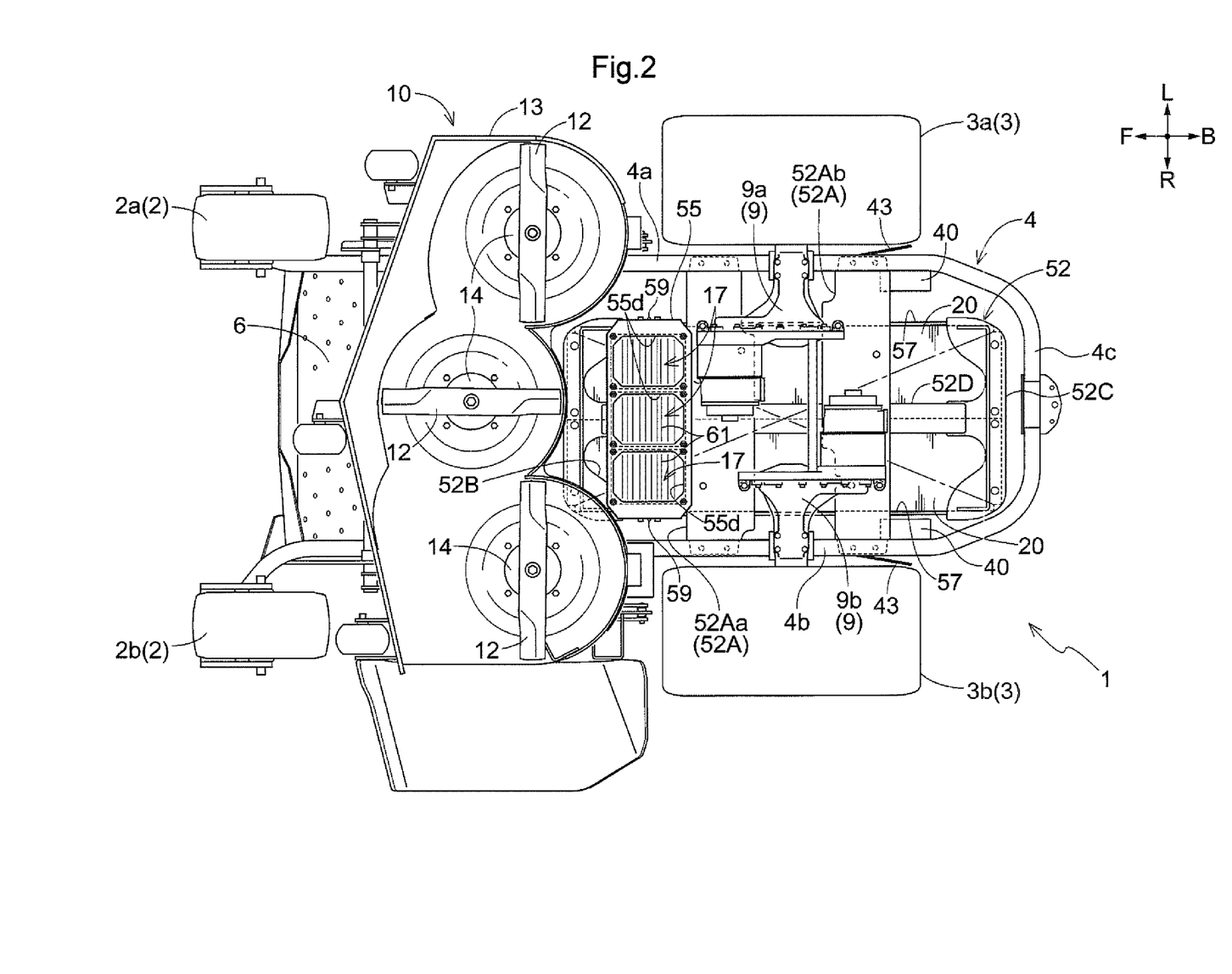
FIG. 2 is a bottom view of an electric mower.

The description below deals with an electric mower as an embodiment. As illustrated in FIGS. 1 and 2, the electric mower is of a riding type, and includes a body 1 provided with front wheels 2, drive wheels 3, and a body frame 4. The front wheels 2 are namely a left front wheel 2a and a right front wheel 2b each in the form of a rotatable caster. The drive wheels 3 are namely a left rear wheel 3a and a right rear wheel 3b. The body frame 4 is supported by the front wheels 2 and the drive wheels 3 on the ground. The body frame 4 includes a left frame section 4a, a right frame section 4b, and a back end section 4c coupling a back end portion of the left frame section 4a to a back end portion of the right frame section 4b.

The body 1 is provided with a driver's seat 5 on which an operator is able to sit. The body 1 is provided with a floor plate 6 in front of the driver's seat 5 on which floor plate 6 the operator is able to place their feet. The body 1 is provided with left and right control levers 7 to the left and right of the driver's seat 5. As illustrated in FIG. 2, the body 1 is provided with two drive wheel motors 9 configured to drive the respective drive wheels 3, namely, a motor 9a configured to drive the left rear wheel 3a and a motor 9b configured to drive the right rear wheel 3b. The operator is able to operate the control levers 7 to change the respective rotation speeds of the left rear wheel 3a and the right rear wheel 3b.

Figure 3:
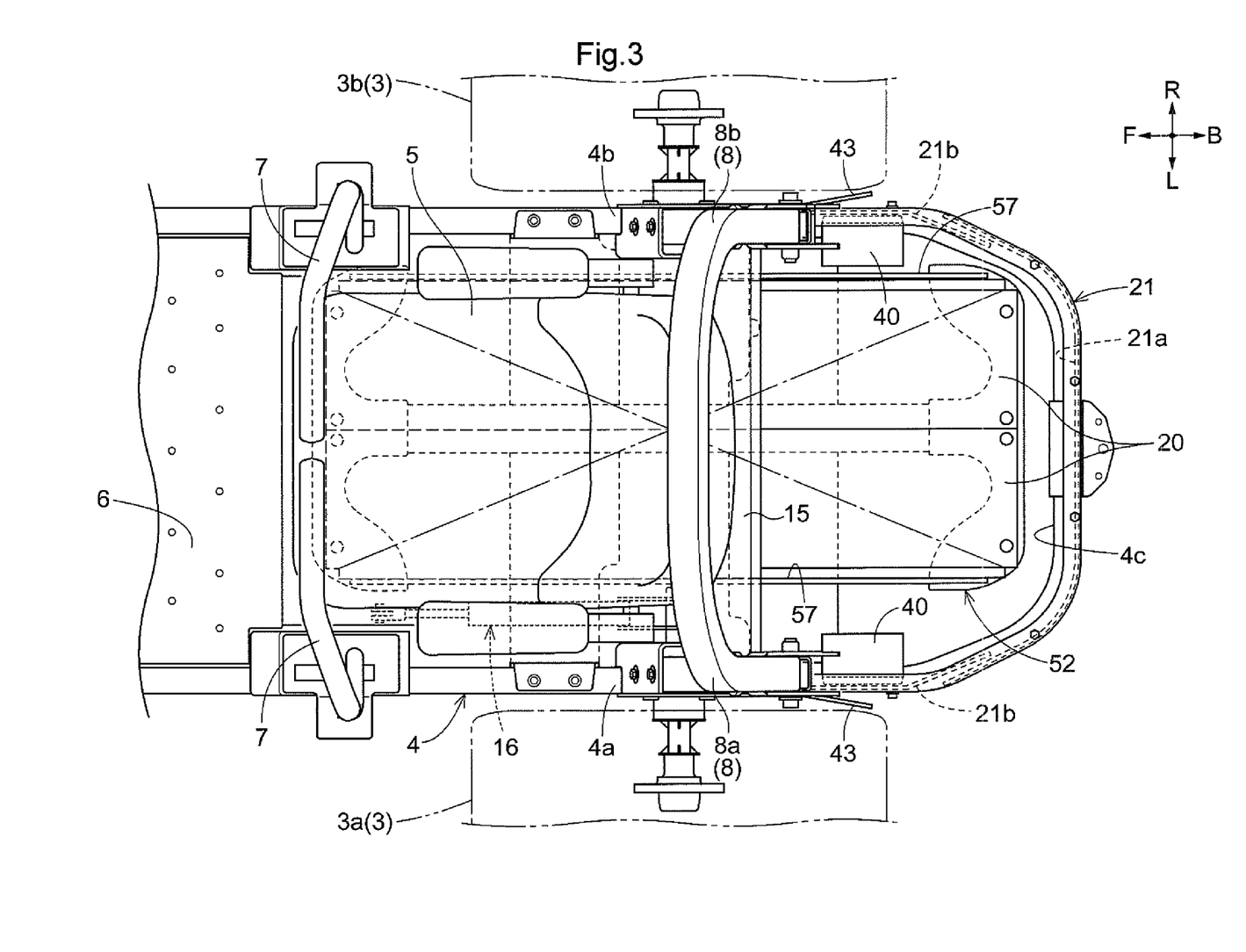
FIG. 3 is a plan view of a back portion of an electric mower.

As illustrated in FIGS. 1 and 3, the electric mower includes a rollover protection structure (ROPS) 8 disposed backward of the driver's seat 5 and fixed to the body frame 4. The ROPS 8 includes a left vertical section 8a fixed to the left frame section 4a, a right vertical section 8b fixed to the right frame section 4b, and a cross member 15 coupling a lower portion of the right vertical section 8b to a lower portion of the left vertical section 8a.

As illustrated in FIGS. 1 and 3, the electric mower includes a battery 20 in a space extending from respective back end portions of the left frame section 4a and the right frame section 4b to below the driver's seat 5. As illustrated in FIG. 3, the electric mower includes a cover 21 covering at least a portion of the battery 20. The cover 21 includes a back wall 21a backward of the battery 20 and a left side wall 21b and a right side wall 21b each extending forward from the back wall 21a. The battery 20 is between the left frame section 4a and the right frame section 4b in a plan view.

The battery 20 is disposed toward a first side (for the present embodiment, the right side) in the left-right direction of the electric mower between the left frame section 4a and the right frame section 4b. The electric mower includes a holder device 16 disposed between the battery 20 and the body frame 4 on a second side (for the present embodiment, the left side) in the left-right direction and configured to temporarily hold a mower unit 10 at its lifted position.

How Battery is Supported

As illustrated in FIGS. 2 to 5, the electric mower includes a plate unit 52 supporting the battery 20 from below. The plate unit 52 includes a first plate 52A, a second plate 52B, a third plate 52C, a fourth plate 52D, and two brackets 57.

Figure 4:
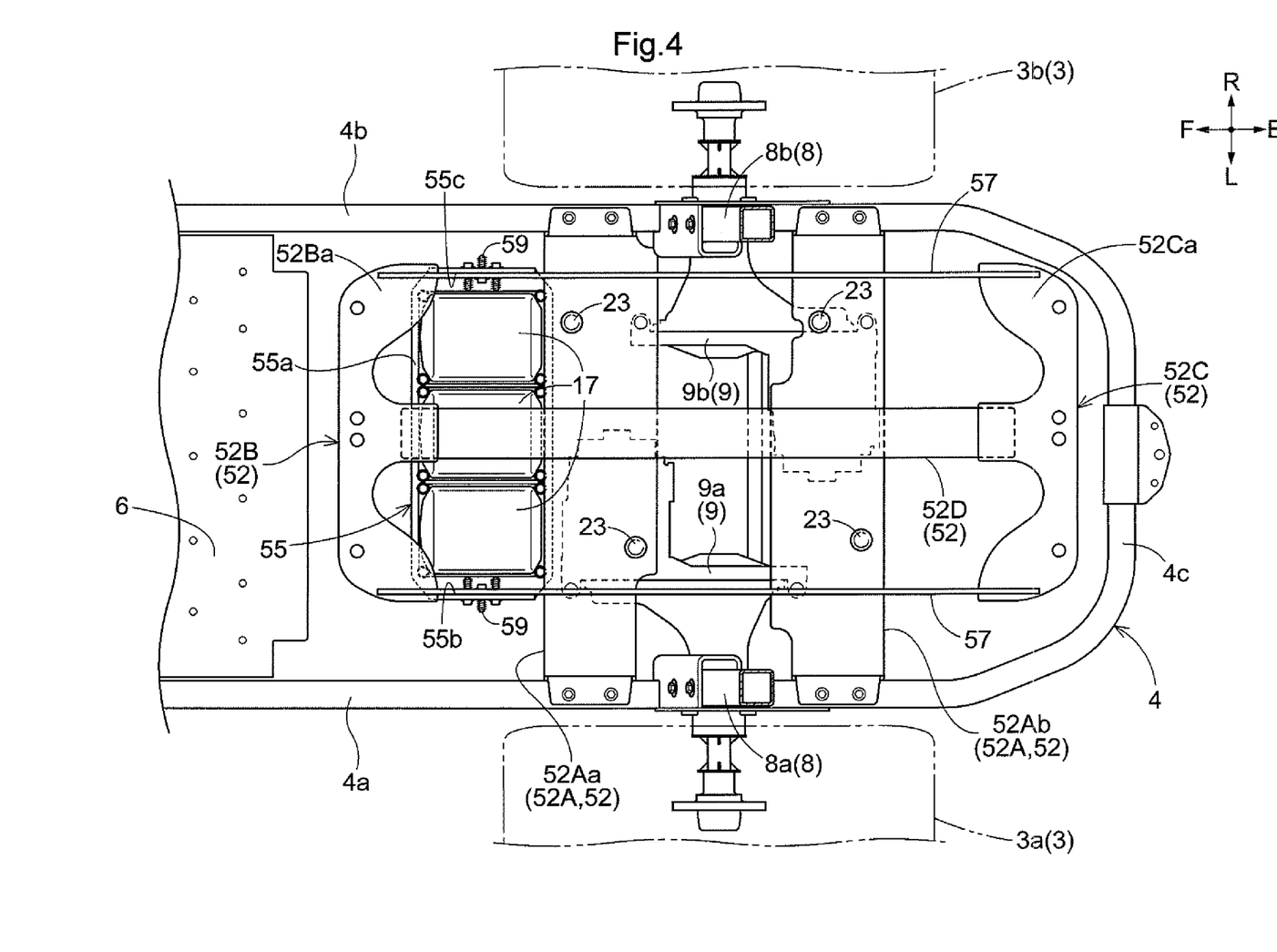
FIG. 4 is a view of elements supporting a battery from below.

The first plate 52A includes a front first plate section 52Aa and a back first plate section 52Ab. The first plate 52A (which includes a front first plate section 52Aa and a back first plate section 52Ab) has a right end portion supported by the right frame section 4b and a left end portion supported by the left frame section 4a, so that the first plate 52A is supported by the body frame 4. The first plate 52A is, for example, bolted to the body frame 4.

The fourth plate 52D is fixed to and supported by the first plate 52A. The fourth plate 52D is, for example, welded to the upper face of the first plate 52A. The fourth plate 52D extends in the front-back direction over the front first plate section 52Aa and the back first plate section 52Ab to protrude forward from the front first plate section 52Aa and backward from the back first plate section 52Ab.

The second plate 52B is fixed to and supported by a front end portion of the fourth plate 52D. The second plate 52B is, for example, welded to the upper face of the front end portion of the fourth plate 52D. The second plate 52B extends to the left and right of the fourth plate 52D. The drawings such as FIG. 4 illustrate an example in which the second plate 52B is supported only by the fourth plate 52D and is not in contact with the body frame 4. The second plate 52B may alternatively be supported by the body frame 4.

The third plate 52C is fixed to and supported by a back end portion of the fourth plate 52D. The third plate 52C is, for example, welded to the upper face of the back end portion of the fourth plate 52D. The third plate 52C extends to the left and right of the fourth plate 52D. The drawings such as FIG. 4 illustrate an example in which the third plate 52C is supported only by the fourth plate 52D and is not in contact with the body frame 4. The third plate 52C may alternatively be supported by the body frame 4.

The brackets 57 are supported by the upper face of the plate unit 52 at respective opposite lateral end portions of the plate unit 52. Specifically, the brackets 57 include a left bracket 57 and a right bracket 57. The left bracket 57 extends from a left end portion of the second plate 52B to a left end portion of the third plate 52C, and is supported by the first plate 52A, the second plate 52B, and the third plate 52C. The right bracket 57 similarly extends from a right end portion of the second plate 52B to a right end portion of the third plate 52C, and is supported by the first plate 52A, the second plate 52B, and the third plate 52C.

The battery 20 is supported by the second plate 52B and the third plate 52C. The battery 20 is, for example, bolted to the respective upper faces of the second plate 52B and the third plate 52C. The brackets 57 hold the battery 20 laterally, so that the battery 20 has a left side portion and a right side portion held by the left and right brackets 57, respectively.

With the above configuration, the second plate 52B and the third plate 52C respectively hold the front and back portions of the battery 20 firmly, so that the plate unit 52 supports the battery 20 efficiently and accurately. Further, the brackets 57 hold and position the battery 20, which allows the battery 20 to be easily bolted to the respective upper faces of the second plate 52B and the third plate 52C.

The plate unit 52 is supported by the body frame 4 (namely, the left frame section 4a and the right frame section 4b) at the first plate 52A, so that the plate unit 52 is supported by the body frame 4 with a simple configuration. With the first plate 52A bolted to the body frame 4, the second plate 52B, the third plate 52C, and the fourth plate 52D are not supported by the body frame 4. This allows the plate unit 52 to be easily attached to and detached from the body frame 4.

Configuration of Mower Unit

The electric mower includes a mower unit 10 between the front wheels 2 and the drive wheels 3 and below the body 1. The mower unit 10 is suspended from the body 1 with use of a lifting and lowering link mechanism 11 in such a manner as to be capable of being lifted and lowered. The mower unit 10 is below the battery 20.

As illustrated in FIG. 2, the mower unit 10 includes three mower blades 12 and a mower cover 13 covering the mower blades 12 from above. The mower unit 10 includes three motors 14 provided for the respective mower blades 12 and drivable on electric power from the battery 20. The mower unit 10 is drivable by the motors 14.

The mower unit 10 includes three controllers 17 configured to control the respective motors 14. The controllers 17 for the present embodiment are each an inverter configured to convert electric current from the battery 20 into a three-phase alternating current with a predetermined frequency and supply the alternating current to the corresponding motor 14, which is thereby driven in accordance with the frequency. The battery 20, the controllers 17, and the motors 14 are connected to one another with use of a harness or the like (not illustrated in the drawings).

The mower unit 10 includes two or more (for the present embodiment, three) combinations of mower blades 12, motors 14, and controllers 17. The controllers 17 are arranged in the direction of the width of the electric mower, and are fixed to the body 1 with use of a support member 55.

How Controllers are Supported

Figure 5:
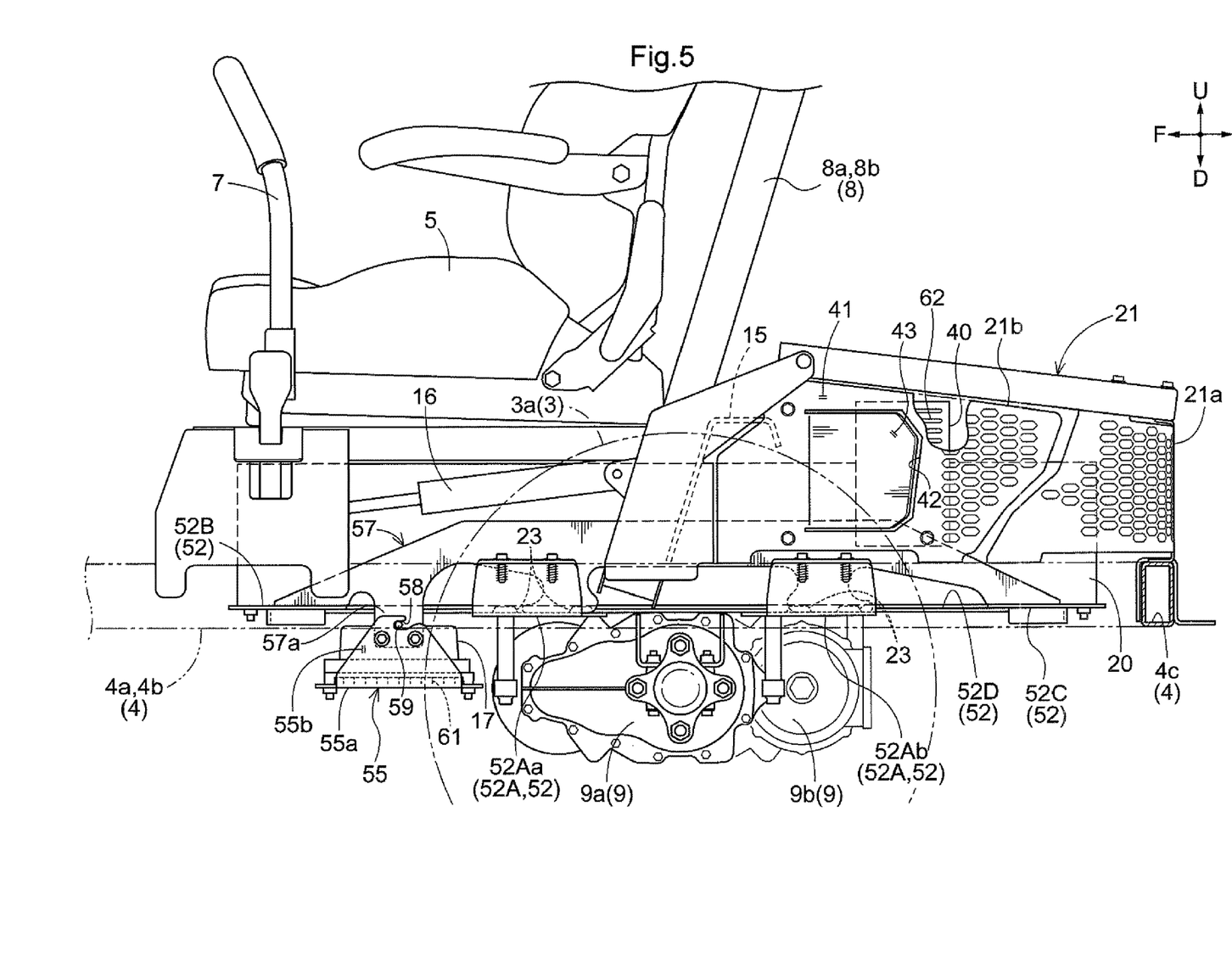
FIG. 5 is a side view of elements supporting a battery and a controller for a work motor and of a cover.
Figure 6:
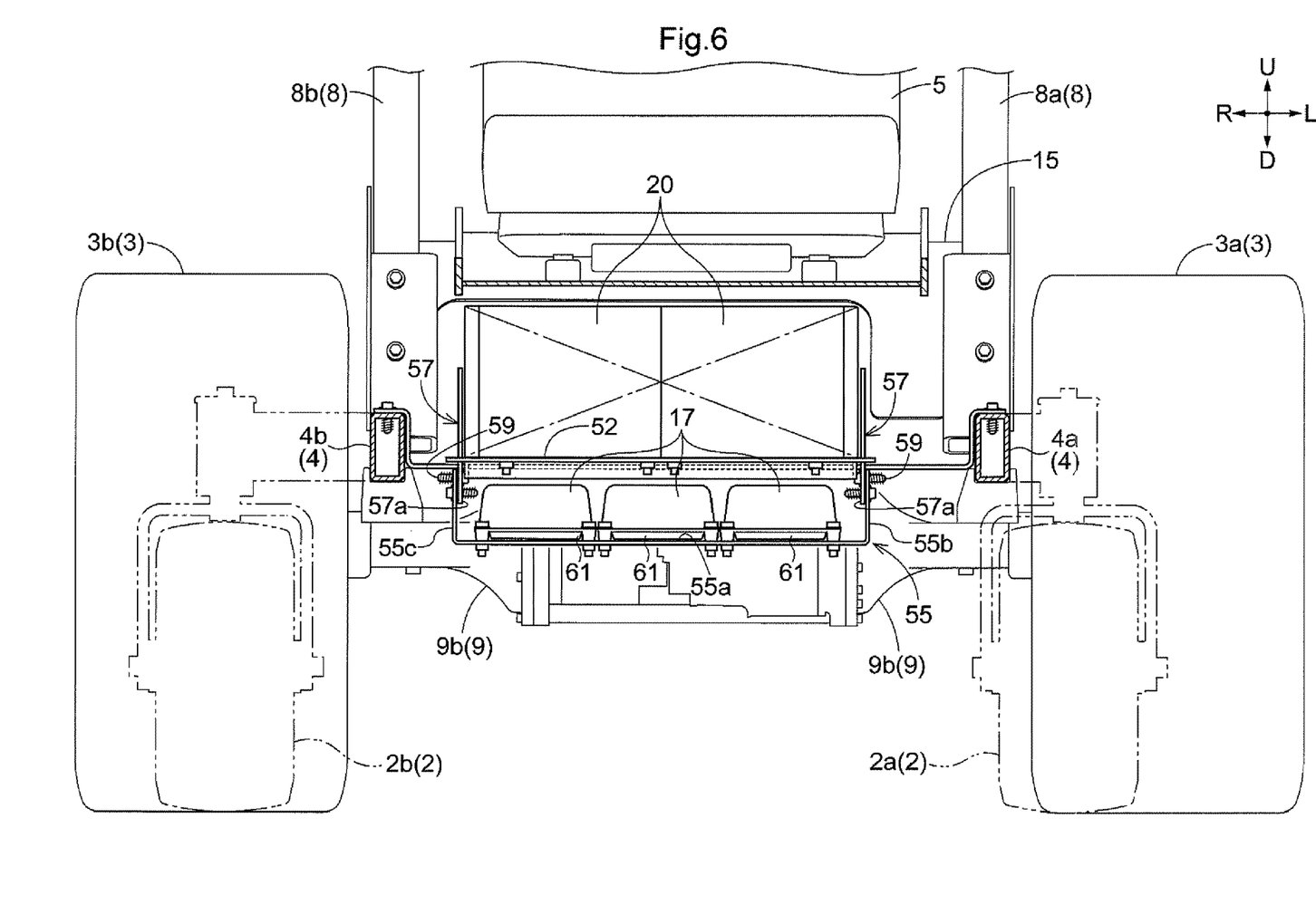
FIG. 6 is a front view of elements supporting controllers for work motors.

As illustrated in FIGS. 4 to 6, the support member 55 is disposed below the battery 20 and fixed to the body 1. The support member 55 includes a support section 55a, a left wall 55b, and a right wall 55c. The support section 55a supports the controllers 17. The support member 55 includes no front wall or back wall, and is open on the front side and the back side. The support member 55 (as well as the controllers 17) is, for example, in a space surrounded by the front wheels 2, the drive wheel motors 9, and the battery 20.

The left wall 30b and the right wall 30c each include a hook section 58 in the form of a notch in the upper end.

The brackets 57 each include a downward protrusion 57a between the second plate 52B and the front first plate section 52Aa in a side view. The brackets 57 are each provided with an engagement section 59 in the form of a pin protruding laterally from the corresponding protrusion 57a.

The support member 55 is suspended from the brackets 57 with each hook section 58 engaged with the corresponding engagement section 59 to be held by the body 1. The support member 55 is fixed to and held by the brackets 57 as, for example, the left wall 55b and the right wall 55c are each bolted to the corresponding protrusion 57a with each hook section 58 engaged with the corresponding engagement section 59.

The above configuration allows the support member 55 to be fixed to the body 1 (specifically, the brackets 57) in such a manner as to be laterally detachable from the body 1 easily. Engaging each hook section 58 with the corresponding engagement section 59 temporarily fixes the support member 55 to the brackets 57 before bolting the support member 55 to the brackets 57. This allows the support member 55 to be held by the brackets 57 accurately and attached to and detached from the brackets 57 easily.

As illustrated in FIG. 2, the support section 55a has three openings 55d through which the respective lower faces of the controllers 17 are exposed downward. In a case where the controllers 17 each include a heat sink section 61 for discharging heat at a lower face thereof, exposing the heat sink section 61 downward through the corresponding opening 31 cools the controller 17 efficiently. The controllers 17 are forward of the drive wheel motors 9, which are configured to drive the respective drive wheels 3, and do not coincide with the mower cover 13 as viewed in the up-down direction.

Configurations of Motors for Driving Drive Wheels and Controller

As illustrated in FIG. 2, the drive wheel motors 9, namely the motors 9a and 9b, are disposed below the battery 20 and fixed to the plate 52. The drive wheel motors 9 are each drivable on electric power from the battery 20.

The electric mower includes two controllers 40 configured to control the respective motors 9a and 9b. In other words, the drive wheels 3 (namely, the left rear wheel 3a and the right rear wheel 3b), the drive wheel motors 9 (namely, the motor 9a and the motor 9b), and the controllers 40 form two combinations. The controllers 40 for the present embodiment are each an inverter configured to convert electric current from the battery 20 into a three-phase alternating current with a predetermined frequency and supply the alternating current to the corresponding one of the motors 9a and 9b, which is thereby driven in accordance with the frequency. The battery 20, the controllers 40, and the drive wheel motors 9 are connected to one another with use of a harness or the like (not illustrated in the drawings).

As illustrated in FIG. 3, the controllers 40 are between the side walls 21b of the cover 21 and on respective opposite sides in the direction of the width of the electric mower. The controllers 40 are each between the battery 20 and the corresponding one of the side walls 21b. The controllers 40 are each backward of a lower end portion of the ROPS 8.

As illustrated in FIG. 5, the side walls 21b are each a plate member 41 positioned in correspondence with the corresponding one of the controllers 40. The plate member 41 has an opening 42 for use in cooling the controller 40, and includes a dust preventer plate 43 configured to prevent suction of dust through the opening 42. The opening 42 has (i) a front end forward of the front end of the controller 40 and (ii) a back end backward of the front end of the controller 40.

Forming the opening 42 and the dust preventer plate 43 involves cutting a slit at a central portion of the plate member 41 in the shape of a substantial U turned by 90 degrees toward the front side and bending the slit portion at the straight line connecting the upper ends of the U. The opening 42 and the dust preventer plate 43 are thus integral with the plate member 41. The dust preventer plate 43 is connected to the front end of the opening 42 and so inclined that a portion farther backward is farther apart from the opening 42 (see FIG. 2).

In a case where the controllers 40 each include a heat sink section 62 for discharging heat, the heat sink section 62 faces the opening 42 and is exposed through the opening 42. This cools the controller 40 efficiently. The holder device 16, which is configured to temporarily hold the mower unit 10 at its lifted position, is forward of that one of the plurality of (for the present embodiment, two) controllers 40 which is on the left.

The description below deals with example alternatives to the embodiment described above.

Alternative Embodiments (1) The embodiment described above under "Detailed Description of the Invention" is not necessarily configured such that the first plate 52A includes two plate sections, namely a front first plate section 52Aa and a back first plate section 52Ab. The first plate 52A may alternatively include a single plate section or three or more plate sections. The first plate 52A is configured according to the configuration and/or size of the battery 20, so that the plate unit 52 supports the battery 20 efficiently and accurately regardless of the configuration or size of the battery 20.

(2) The embodiment described above under "Detailed Description of the Invention" is not necessarily configured such that the battery 20 is supported by the second plate 52B and the third plate 52C. The battery 20 may alternatively be supported by not only the second plate 52B and the third plate 52C but also at least either the first plate 52A or the fourth plate 52D. The battery 20 may further alternatively be supported by at least one of the first plate 52A, the second plate 52B, the third plate 52C, and the fourth plate 52D. This indicates a larger degree of freedom in how the battery 20 is supported.

(3) The embodiment described above under "Detailed Description of the Invention" is not necessarily configured such that the fourth plate 52D extends in the front-back direction from the second plate 52B to the third plate 52C. The fourth plate 52D may be configured in any manner as long as the fourth plate 52D is supported by the first plate 52A and supports the second plate 52B and the third plate 52C.

(4) The embodiment described above under "Detailed Description of the Invention" is not necessarily configured such that the first plate 52A is supported by the left frame section 4a and the right frame section 4b. The first plate 52A may be supported by the body 1 in any manner.

(5) The embodiment described above under "Detailed Description of the Invention" may be configured such that the second plate 52B includes, at each of opposite lateral end portions thereof, a first support 52Ba protruding backward to support the battery 20 and/or that the third plate 52C includes, at each of opposite lateral end portions thereof, a second support 52Ca protruding forward to support the battery 20. The plate unit 52, with the first supports 52Ba and/or the second supports 52Ca, has a larger area for supporting the battery 20, and thereby supports the battery 20 more accurately.

(6) The embodiment described above under "Detailed Description of the Invention" is not necessarily configured such that the first plate 52A, the second plate 52B, the third plate 52C, and the fourth plate 52D are separate members connected to one another. The four plates may be integral with one another.

(7) The embodiment described above under "Detailed Description of the Invention" is configured such that the first plate 52A is at a position below the battery 20. The first plate 52A may be configured such that the front first plate section 52Aa is forward of the position at which the ROPS 8 is coupled to the body frame 4 and that the back first plate section 52Ab is backward of that position.

(8) The embodiment described above under "Detailed Description of the Invention" may be configured such that the plate unit 52 supports the battery 20 with elastic members 23 in-between. The elastic members 23 are made of rubber, for example, and allow the battery 20 to be supported by the plate unit 52 more accurately. The elastic members 23 are on the respective upper faces of the second plate 52B and the third plate 52C, and may additionally be on the upper face of at least either the first plate 52A or the fourth plate 52D.

(9) The embodiment described above under "Detailed Description of the Invention" is an example in which the ROPS 8 includes a cross member 15. The present invention is, however, not limited to such a configuration, and may be configured such that the ROPS 8 does not include a cross member 15.

(10) The embodiment described above under "Detailed Description of the Invention" is not necessarily configured such that the brackets 57 are supported by the first plate 52A, the second plate 52B, and the third plate 52C. The brackets 57 may be supported by any portion of the plate unit 52. Further, the brackets 57 are not necessarily supported by the plate unit 52, and may alternatively be supported by any portion of the body 1 such as the body frame 4. The brackets 57 may alternatively be absent, so that the engagement sections 59 are each at a portion of the body 1 such as the body frame 4.

(11) The embodiment described above under "Detailed Description of the Invention" may be configured such that the support member 55 has no openings 55d.

(12) The embodiment described above under "Detailed Description of the Invention" is not necessarily configured such that the controllers 17 (or the support member 55) are in the above-described positional relationship with the mower cover 13 and the drive wheel motors 9. The controllers 17 may be in any positional relationship with the mower cover 13 and the drive wheel motors 9.

(13) The embodiment described above under "Detailed Description of the Invention" is not necessarily configured such that the controllers 17 are supported by the support member 55 as arranged laterally (that is, along the width of the electric mower). The controllers 17 may be arranged in any manner.

(14) The embodiment described above under "Detailed Description of the Invention" is an example including a ROPS 8. The present invention is, however, not limited to such a configuration, and may omit the ROPS 8.

(15) The embodiment described above under "Detailed Description of the Invention" is an example including a holder device 16. The present invention is, however, not limited to such a configuration, and may omit the holder device 16.

(16) The embodiment described above under "Detailed Description of the Invention" is an example including a dust preventer plate 43 at the opening 42. The present invention is, however, not limited to such a configuration, and may omit the dust preventer plate 43.

(17) The embodiment described above under "Detailed Description of the Invention" is an example in which the dust preventer plate 43 is so inclined that a portion farther backward is farther apart from the opening 42. The present invention is, however, not limited to such a configuration, and may be configured such that the dust preventer plate 43 is, for instance, parallel to the opening 42.

(18) The embodiment described above under "Detailed Description of the Invention" is an example in which the controllers 40 are each backward of a lower end portion of the ROPS 8 and in which the opening 42 has (i) a front end forward of the front end of the controller 40 and (ii) a back end backward of the front end of the controller 40. The present invention is, however, not limited to such a configuration, and may be configured, for instance, such that the controllers 40 are each forward of a lower end portion of the ROPS 8 and that the opening 42 has a front end backward of the back end of the controller 40.

(19) The embodiment described above under "Detailed Description of the Invention" is an example including three combinations of mower blades 12, motors 14, and controllers 17. The present invention is, however, not limited to such a configuration, and may include fewer or more combinations of the above.

(20) The embodiment described above under "Detailed Description of the Invention" is an example in which the controllers 17 and the controllers 40 are each an inverter. The present invention is, however, not limited to such a configuration, and may be configured such that the controllers 17 and the controllers 40 are each another electric current converter.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

REFERENCE SIGNS LIST

2 Front wheel
3 Drive wheel
4 Body frame
4a Left frame section
4b Right frame section
4c Back end section
5 Driver's seat
10 Mower unit
15 Cross member
16 Holder device
20 Battery
23 Elastic member
52 Plate unit
52A First plate
52B Second plate
52Ba First support
52C Third plate
52Ca Second support
52D Fourth plate
57 Bracket

The invention claimed is:

1. An electric mower, comprising:
a wheel;
a body frame including a right frame section and a left frame section and supported by the wheel on ground;
a battery between the right frame section and the left frame section in a plan view; and
a plate unit supported by the body frame and supporting the battery from below the plate unit being attachable to and detachable from the right frame section and the left frame section,
the plate unit including:
at least one first plate supported by the right frame section and the left frame section;
a second plate forward of the at least one first plate;
a third plate backward of the at least one first plate; and
a fourth plate supported by the at least one first plate, the fourth plate supporting and overlapping the second plate and the third plate;
wherein the at least one first plate, the second plate, the third plate, and the fourth plate are horizontal.

2. The electric mower according to claim 1, wherein the fourth plate extends in a front-back direction of the electric mower from the second plate to the third plate.

3. The electric mower according to claim 1, wherein the body frame includes a back end section connected with a back end portion of the right frame section and a back end portion of the left frame section, and the third plate is apart from the right frame section, the left frame section, and the back end section.

4. The electric mower according to claim 1, wherein the second plate includes, at each of opposite lateral end portions thereof, a first support protruding backward to support the battery, and
the third plate includes, at each of opposite lateral end portions thereof, a second support protruding forward to support the battery.

5. The electric mower according to claim 1, wherein the plate unit further includes a bracket holding the battery laterally.

6. The electric mower according to claim 1, wherein the at least one first plate, the second plate, the third plate, and the fourth plate are integral with one another.

7. The electric mower according to claim 1, wherein the at least one first plate includes a plurality of first plates.

8. The electric mower according to claim 7, further comprising:
a rollover protection structure fixed to the body frame at a position,
wherein the at least one first plate includes two first plates forward and backward of the position, respectively.

9. The electric mower according to claim 8, wherein the rollover protection structure includes:
a right vertical section fixed to the right frame section;
a left vertical section fixed to the left frame section; and
a cross member coupling a lower portion of the right vertical section to a lower portion of the left vertical section.

10. The electric mower according to claim 1, wherein the battery is fixed to the at least one first plate with an elastic member in-between and to the second plate, the third plate, and the fourth plate with no elastic member in-between.

11. The electric mower according to claim 1, further comprising:
a driver's seat,
wherein the battery is in a space extending from respective back end portions of the right frame section and the left frame section to below the driver's seat.

12. The electric mower according to claim 1, further comprising:
a mower unit disposed below the battery and capable of being lifted and lowered.

13. The electric mower according to claim 12, wherein the battery is disposed toward a first side in a left-right direction of the electric mower,
the electric mower further comprises a holder device disposed between the battery and the body frame on a second side in the left-right direction and configured to temporarily hold the mower unit at a lifted position.

* * * * *